Aug. 17, 1943.   J. D. SARTAKOFF   2,326,974
METHOD OF TESTING THE FELTABILITY OF HATTERS' FUR
Filed June 28, 1939   4 Sheets-Sheet 3

INVENTOR.
Jack D. Sartakoff
BY
ATTORNEY.

Patented Aug. 17, 1943

2,326,974

UNITED STATES PATENT OFFICE 2,326,974

METHOD OF TESTING THE FELTABILITY OF HATTERS' FUR

Jack D. Sartakoff, Douglaston, Long Island, N. Y., assignor to No-Mercury Felt Corporation, a corporation of New York Application June 28, 1939, Serial No. 281,692

1 Claim. (Cl. 73—51)

This invention relates to the testing of fur to determine its feltability and usefulness for the manufacture of hats. Under present practice, it is difficult, if not impossible, to determine from the mere inspection of fur whether or not it will produce a hat of a predetermined character and grade. This is particularly true, as is usually the case, where hats are made from a mixture of furs of different kinds or character, the whole being so constituted or blended as to produce the desired properties, weight, etc.

The practice in the hat factory is to take a quantity of carroted fur as a sample and to run this sample through testing operations, employing the usual hat making machines and steps, to make up four or six hat bodies. If two ounce hats are to be made six samples will usually be run, whereas if four ounce hats are to be produced four sample hat bodies will be made. The performance of the fur in making these samples will indicate its usefulness and properties for the production of hats of a particular grade and weight.

Although this practice is universally followed, it is open to numerous disadvantages. In the first place fur is expensive and an appreciable amount of fur is required to make up the sample hat bodies referred to. If these hat bodies do not fulfill the requirements, they constitute a loss and it may be necessary to duplicate the sample tests one or more times in order to obtain a satisfactory mixture or blend and to obtain proper performance in every particular. Furthermore, these tests have invariably been run on standard hat making machines including blowers, bat forming machinery, wetting apparatus, hardening machines and felting machines. The usual practice is to employ the #80 cone which has a surface of approximately 1,000 square inches, so that, if the test run is not satisfactory, there is a waste of between 5 pounds and 10 pounds of fur, the market value of which is upwardly of $10. Moreover, the regular hat making machines, when employed in testing as stated, are necessarily withdrawn from regular production and the test must be attended by several highly skilled operators. As a result, these tests have been expensive and slow down production, but, prior to the present invention, no satisfactory substitute was known, as tests are essential before attempting quantity production of fur in the making of hats.

I have engaged in much study and research over a protracted period to discover some satisfactory method by which a sample of fur could be subjected to an economical preliminary test which would definitely determine its characteristics and usefulness for the purposes stated. My primary object was to eliminate the expensive testing which has been practised in the industry from time immemorial and to substitute therefor an inexpensive method and apparatus which could be used exclusively for this purpose and which might be handled by a single operator who did not necessarily possess a high degree of skill. I felt that if this object could be accomplished, the regular hat making machinery would be released for regular production and the expense attendant upon tests as heretofore made would be in a great measure eliminated.

My work in this connection has demonstrated that this object may be accomplished through the testing of relatively small quantities of fur in the making of a relatively small flat felt, the behavior of which, during the several operations through which it is passed, may be more accurately observed and measured than can possibly be accomplished with a cone form. I have found this to be particularly true because it is possible to form a flat felt of uniform thickness throughout, whereas a conical felt will invariably run thicker at the base of the cone than at the apex thereof. In fact, there is a pronounced difference in the thickness of the apex of a cone-formed felt than there is at its base, so that the felting of a cone is not as uniform as the felting in a flat felt. Thus, in making a flat felt, it is possible to get a true and accurate gauge of the felting properties of the fur and an accurate determination of its shrinkage, loss of weight and speed of felting, which cannot be so accurately gauged in a cone shaped felt. By my procedure the characteristics of a fur may be correctly indicated by the making of a flat felt thereof and of such size as to render the same easily manipulated and economically produced.

Thus, in carrying out the method of the present invention, I take a carefully weighed sample of the carroted cut fur to be tested, which sample may satisfactorily be in a quantity as small as 10 to 20 grams and I pass this sample through mixing and blowing operations to thoroughly mix and fluff the fur. The fur is thereupon carried, by a moving current of air, against a rotating screen having a plane surface, to form on said screen a circular bat of a diameter which may conveniently be 100 or 200 square inches. After the flat bat has been formed, it is removed from the screen, placed under pressure and wet. This wet, flat bat is thereupon passed through a plurality of felting rounds, followed by a plurality of shrinking rounds. It is then permitted to dry and constitutes a sample of the finished felt appropriate to the particular steps through which it passed. Measurements of the diameter of the bat and felt, after it has passed through each step or round, are carefully tabulated.

Different mixtures of fur are subjected to identical procedure, so that, at the completion of a series of tests of this character, there is obtained concrete information in the form of data appropriate to each test. This data is exemplified moreover by one finished felt sample for each particular fur mixture. The finished felt samples may be compared with one another and, from the information thus at hand, it is possible to accurately determine which sample of fur is the best for the contemplated commercial run. This having been determined, the operators of conventional hat making machinery may be given definite instructions as to the particular mixture used, the quantity of fur, the number of rounds, etc., to be employed; in short, the technique to be practised for the making of a particular commercial run of hats, and when these hats are produced they will be found to correspond to the sample after which they were patterned.

I have tested very numerous samples of fur, such as are commonly used for the making of hats and from the voluminous data which I have thus obtained, it has been possible to accurately classify different furs as to their feltability, e. g., "extra fast," "fast," "over normal," "normal," "subnormal," "slow," "extra slow," etc. These designations of fur classification refer to the behavior of the furs in conventional hat making machines. From this data and through the use of the method and apparatus of this invention, it has been possible to prepare a table or graph showing a definite relationship between particular furs. From this classification and from the data which is obtained through the testing of any particular fur mixture, it is possible to see by a glance at this graph, to what classification the fur under test belongs and how many rounds, bats formed on cones of different sizes, must be subjected to in conventional hat making machines in order to give a satisfactory practical product.

The present invention has thus made it possible to standardize the classification of furs and in this respect it is unique, for never before has there been known to this art any such standardization or classification.

The apparatus by which the method of this invention is preferably carried out provides for the performance of all of the steps of the method within a single test unit of relatively small dimensions, in contradistinction to a large number of conventional production machines which have heretofore been necessary for the testing of fur. Moreover, a single operator can readily handle the test machine and, as the tests proceed, note down data which is useful at the conclusion of the tests for the determination of the technique of quantity production.

The apparatus, as will be hereinafter more fully explained, is simple in construction, economical to manufacture and thoroughly reliable in the performance of its intended functions.

Features of the invention, other than those adverted to, will be apparent from the hereinafter detailed specification and claim, when read in conjunction with the accompanying drawings.

The accompanying drawings illustrate one form of apparatus for carrying out the method of this invention, but the construction therein shown is to be understood as illustrative, only, and not as defining the limits of the invention.

Figure 1:
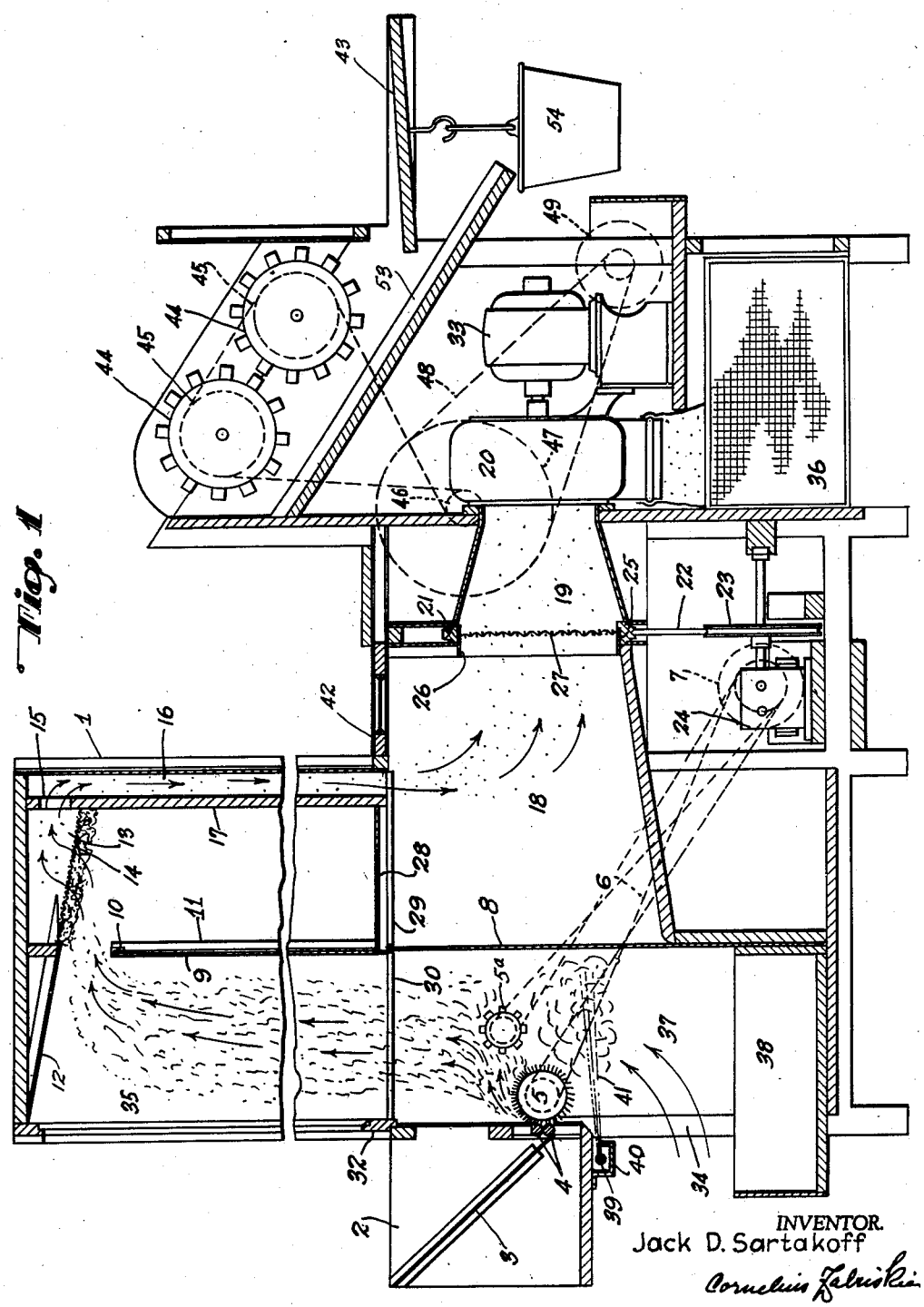
Figure 1 is a vertical section taken longitudinally through a machine embodying the present invention, the parts being shown in position to carry out the "blowing" operation.
Figure 2:
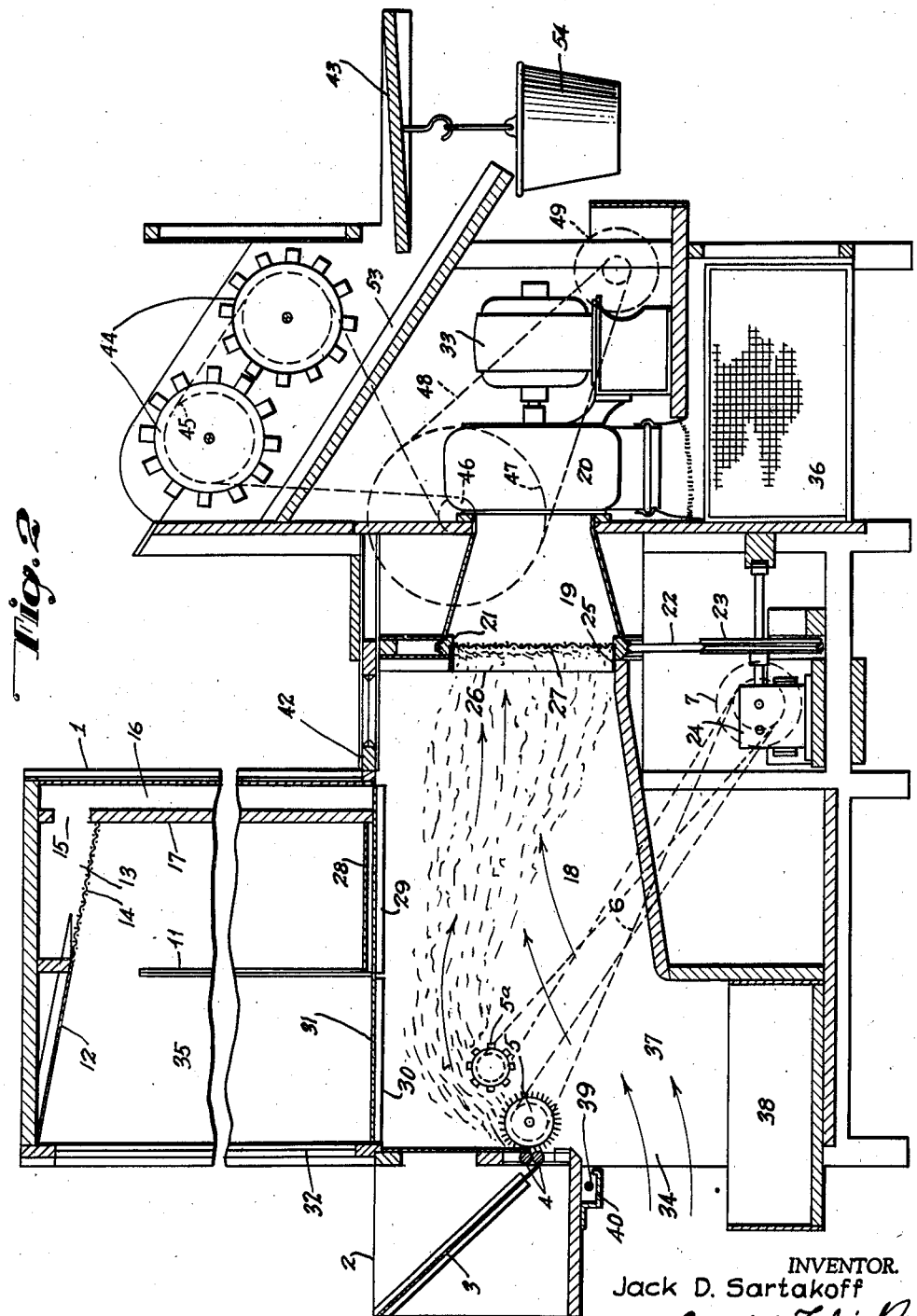
Figure 2 is a like section showing the parts arranged to carry out a bat forming operation.
Figure 3:
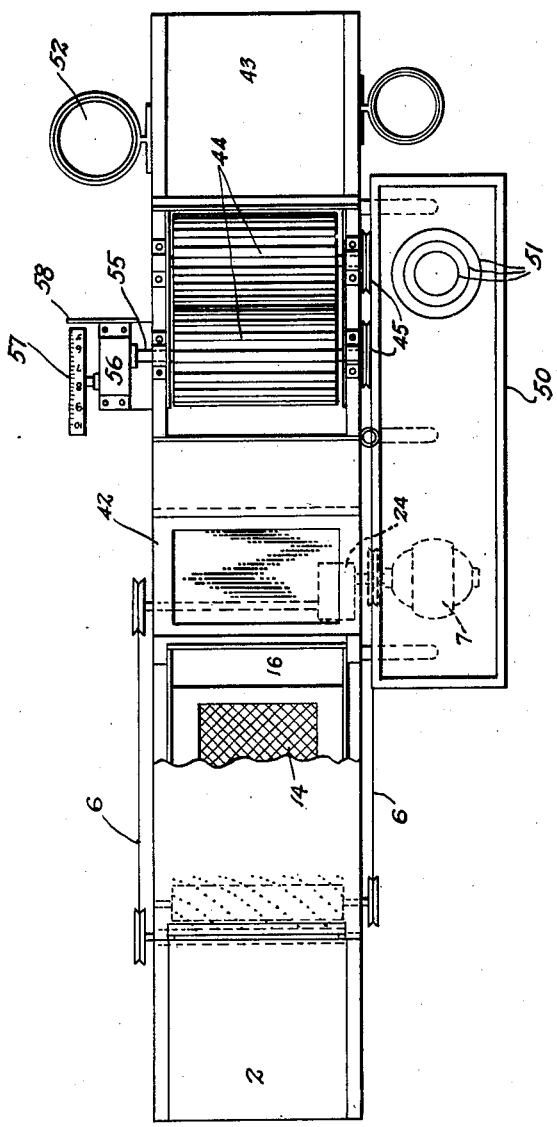
Figure 3 is a plan view of the apparatus.

That portion of the apparatus for preliminarily treating the fur is so constituted that it is adapted to take fur from a clipping operation, properly mix such fur, blow the same, and thereafter feed the fur to a bat forming operation from which the felt is subsequently made. This portion of the apparatus is indicated at the left of Figs. 1, 2 and 3. It comprises an upright housing 1, as shown in Fig. 1, provided about midway of the height of its front wall with a fur feeding hopper 2 embodying an inclined table 3 down which fur is fed by gravity to a pair of rolls 4. These rolls feed the fur to a picker roll 5 rotating in a clockwise direction and driven through a belt 6 from a motor 7. This roll 5 separates the fur and throws it into the interior of the housing 1.

The picker roll is provided with pins arranged in a plurality of rows extending in helical paths. Preferably the pins of each row are staggered or laterally offset with respect to the pins of the other rows, so that only one pin occupies any one radial plane including the axis of the roll. Thus said pins are progressively and successively brought into cooperative relation, one at a time, with the fur fed from the feed rolls 4. In this way the load on the driving mechanism for the picker roll is uniformly distributed throughout each complete rotation of the picker roll. Consequently I am able to operate this roll with but a small fraction of the power heretofore required to operate the conventional picker rolls of the prior art wherein the pins are arranged in rows having straight line relation parallel to the axis of the roll.

Positioned adjacent the picker roll 5 is a slatted dispersing roll 5a against which the fur is thrown by the picker roll and which serves to fluff the fur, and thoroughly separate the fibers thereof. Roll 5a is driven like the roll 5 from the motor 7.

Extending transversely across the housing are two upright partitions 8 and 9 placed one above the other. Partition 8 extends from the bottom of the housing up to the level of the top of the hopper, while the partition 9 is superimposed thereon and extends upwardly to near the top of the housing, being provided at its top with hooks 10 detachably engaging angle sections 11 secured to the opposite lateral walls of the housing. The partitions 8 and 9 are thus removable and may be conveniently made of aluminum or some other light material so that they may be conveniently handled.

In the upper portion of the housing is an inclined partition 12 having therein an opening 13 covered by a screen 14 and the space above this screen connects, through an opening 15, with a flue 16 formed between the back wall of the housing and an upright partition 17. The bottom of the flue 16 opens into a chamber 18, at the rear end of which is the inlet 19 of a suction pump 20. At the mouth of the inlet 19 a coaxial pulley 21 is mounted to rotate and is driven by a belt 22 from a pulley 23 connected, through a reducing gear box 24, with the motor 7.

The pulley 21 is of annular form and is provided therein with a seat 25 adapted to detachably receive the annular metal frame 26 of the bat former, and across this annular frame is stretched a screen 27 on which the bat to be felted is adapted to be formed.

The space between the partitions 9 and 17 has a floor 28 which may be fixed or removable as desired, and extending longitudinally beneath this floor are guides 29 which aline with guides 30 forwardly of the partition 9 and these guides 29 and 30 are adapted to collectively support a horizontal partition 31 which, when in the position of Fig. 2, will block off the entire upper portion of the casing. The front wall of the casing, above the feed hopper 2, is normally closed by a vertically slidable door 32 preferably glazed, so that the interior of the hopper may be observed. This door may be raised when desired to adjust the partitions 8, 9 and 31 (Fig. 2), but under all normal conditions said door 32 is closed. The suction pump 20, preferably a centrifugal pump, is driven by a motor 33 and serves to create a suction interiorly of the housing 1.

The parts are shown in Fig. 1 with the machine conditioned to carry out mixing and blowing operations in the housing 1. To this end the partitions 8 and 9 are in place. Clipped, mixed fur is fed to the picker roll 5 and is thrown into the machine in separated condition, into a current of air which is flowing through a front opening 34. This current of air passes upwardly through the chamber 35 between the partition 9 and the door 32, passes over the top of the partition 9 and through the screen 14, thence it passes through opening 15, downwardly through the flue 16 to the chamber 18 and thence through the screen 27 to the pump inlet 19. The pump 20 discharges into a foraminous container 36 through the walls of which the air returns to the atmosphere, while particles of matter entrained in such current are retained within the container 36 and may be removed therefrom from time to time.

As the fur is thrown by the roll 5 into this current of air, the light and separated parts thereof are carried along therewith to the screen 14 on which they collect in the form of a loose bat. The heavier particles, pieces of skin, etc., fall to the bottom of the chamber 37 and are received in a receptacle 38.

This operation of separating and mixing the fur and collecting the same upon the screen 14 may be referred to as a blowing operation. The material collected in the container 38 may be re-introduced into the hopper and, by its passage through cooperation with the picker and dispersing rolls 5 and 5a, some of the parts of this fur which have adhered together and thus matted may be broken up and added to the fur at the screen 14. The heavier particles will again fall into the container 38, from which they are removed and discarded.

The fur which forms on the screen 14 will remain there until the suction of the fan 20 is broken. However, when the fan is stopped, the fur will immediately fall from the screen 14 on to the partition 28 and the blowing and mixing step of the process is then complete for this fur is in a nicely divided state and constitutes a fluffy mass. This thoroughly mixed and blown fur may be taken out and re-run if desired, but this is usually not necessary.

There are times in the operation of the apparatus, and particularly when the humidity in the atmosphere is very low, that the fur becomes so fluffy that it is difficult to handle and in some cases it may tend to adhere to the sides of the apparatus. In such cases I have found it desirable to humidify the air passing into the apparatus. This may be conveniently accomplished by extending across the front opening 34 a steam pipe 39, covered by a suitable guard 40 and perforated so as to discharge live steam 41 into the current of air as it enters into the apparatus for the purpose of imparting thereto sufficient moisture to overcome the disadvantages to which I have referred.

At the conclusion of the blowing operation, the door 32 is opened and the operator reaches in and removes the partitions 8 and 9, takes the blown fur from partition 28 and inserts the partition 31 and again closes the door, so that the parts will be as shown in Fig. 2. The partition 31 closes off the entire upper portion of the housing 1 and extends across and seals the bottom of the flue 16.

The motors 7, 33 are now started again to operate the picker roll 5 and place a suction in the inlet 19 back of the screen 27. A carefully weighed quantity, say 10 grams, of the blown fur produced in the previously described blowing steps or steps is now fed to the hopper 2 and passes therefrom to the picker roll and dispersing roll 5a where it is thoroughly broken up or separated and in thus separated condition it is entrained in the current of air passing through the front opening 34 and carried to the screen 27, on which it comes to rest. Meanwhile the screen is slowly rotated by the belt and pulley connection described, so that the fur becomes uniformly matted in the form of a loose bat upon said screen.

This is an important operation because this loose bat should be of uniform thickness throughout and the screen employed, as well as the speed of rotation of the screen, should be such as to insure its uniformity. If too much suction is present, it may be decreased by opening, to a greater or lesser extent, a sliding panel 42 in the top of the chamber 18. In practice this panel preferably carries a pointer or other indicator working over a stationary scale on the exterior of the wall of the chamber 18, so that after the desired adjustment has been obtained, the sliding panel can be readily returned to this adjustment after being opened to gain access into the interior of the machine.

The after end of the machine carries the mechanism which supports the suction fan 20 and its motor 33, as well as a pair of cooperating felting drums 44 and their driving mechanism. The drums 44 extend transversely of the machine and have slatted peripheries. They rotate in the same direction and each is provided at one end with a pulley 45. A belt extends around both pulleys and about a speed reducing pulley 46, driven from a larger speed reducing pulley 47 which is, in turn, driven by a belt 48 from a motor 49.

It will be noted that there are three distinct sources of power embodied in this single machine. The motor 7 serves to drive the picker and dispersing rolls 5 and 5a and to rotate the bat former 26. The second serves to operate the pump 20 and the third furnishes power to the drums 44. Consequently, these several parts may be operated wholly independent of one another, so that a number of different fur samples can be manipulated at the same time in different parts of the machine. For example, the blowing operation may be carried out on one sample, while a felting operation is proceeding on another sample, and the motor 20 may be functioning for a blowing operation, while there is no screen in place at the mouth of the suction chamber 19. The use of separate sources of power, therefore, has a distinct advantage in making the machine more flexible, as well as in simplifying mechanical connections and making them selectively operable.

The bat former, consisting of the screen 27 and the metal annulus 26 in which it is mounted, is removable from the pulley 21 which forms their holder. The bat formed thereon is a flat bat of uniform thickness throughout and when it is produced upon this former, it tends to adhere thereto when the suction from the pump 20 is relieved. Thus, when the formation of the bat is complete, the sliding panel 42 is opened and the operator reaches into the chamber 18 and removes the bat former with the bat thereon. He lifts this assembly to the back end of the machine and lays it upon a table 43 with the bat up.

A flat perforated disk of metal is then placed on the top of the bat and pressed down tightly, preferably manually, while hot water at about 140°-160° F. is poured on said disk, passes through the perforations and permeates the bat. As soon as the bat is thoroughly wet, the perforated disk is removed and the holder is then inverted on a table 50, shown at the side of the machine in Fig. 3, to discharge the wet bat on to said table. The bat holder is dried and returned to the machine to receive the next bat. The bat just removed is measured to determine its diameter which, for the purpose of concrete example, may be 11.2" which resulted from the use of a bat forming screen of 100 square inches. A series of concentric circles 51 are shown as delineated on the face of the table 50 and said bat is preferably laid on this portion of the table and smoothed out, so that it will be substantially circular when it is measured. There are sometimes slight irregularities which may be stretched to render the bat round, so that the measurement may be fairly accurate. If the bat is slightly out of round, the average diameter should be noted as constituting the measurement of the bat at the conclusion of the forming stage.

The bat is marked for identification, as by taking a stitch with colored thread at one point in its circumference and it is then laid aside between two layers of textile fabric and is allowed to rest on the table 50 while subsequent samples of other mixtures of fur are passed through the machine to any appropriate number, usually six, and as the various forming operations are completed on the successive samples, they are consecutively marked and stacked on top of the first sample, with interposed wet cloths, until all of them are completed and form a stack ready for the first felting operation. The dimension of each formed bat is taken, as in the case of the first sample and data with reference thereto is carefully noted. The cloths used are marked at their margins with indications positioned at 45° intervals to facilitate subsequent manipulation.

The six samples, stacked as stated, are now collectively rolled in said wet cloths, immersed for a moment in hot water contained in a receptacle 52 at one side of the table 43, and thereupon the hot wet roll is deposited above the bight of the drums 44. These drums are driven at a predetermined rate of speed in the same direction and serve to cause the roll of samples to be tumbled or rolled over and over as the successive slats engage the roll of samples. Water dripping or falling from the samples is caught by a trough 53 which leads it to a pail 54 below the table 43.

It is important that the operation of the drums 44 upon the test samples be accurately determined and for this reason the shaft 55 of one of said drums is connected to a counter 56 carrying a drum 57 (see Fig. 3), the periphery of which contains numerals signifying rotations or periods of operation of the drums 44 and a pointer 58 cooperates with the drum 57 to facilitate the accurate reading thereof.

This first mechanical operation of the drums 44 upon the samples constitutes the first hardening step of the first felting round and may conveniently be carried on for about ¼ minute, as shown by the counter. At the end of this step, the roll of samples is removed from the drums 44, is unrolled, laid out to rest flat on the table and thereupon restacked in different order between the same cloths. The stack is thereupon rolled up again but in 90° relation to the first rolling. After this re-rolling the roll is dipped into hot water and again returned to the felting drums, where the operation before described is repeated. These operations are repeated four times in all with re-stacking and re-rolling between each operation, so that at the conclusion of these four hardening steps, i. e., at the conclusion of what may be termed the first felting round, the samples have been rolled in four distinct directions 45° to one another in order that these four hardening steps act to produce a felting in four distinct directions. At the end of these operations, i. e., at the end of the first round of the felting, the samples are laid on a table and are unstacked and each sample is carefully measured to determine its diameter. We will assume, for the purpose of present example, that sample I has now a diameter of 10.4" at the end of the first round. Several samples have, in the manner described, been subjected to four distinct hardening steps which collectively constitute the first felting round. In ordinary commercial practice, these hardening operations are carried out in a purely manual manner and some of the most highly skilled workmen are employed in this work for it requires a high degree of skill and experience to harden felt bats. Irrespective, however, of the degree of skill which the workman may possess, it is utterly impossible to obtain uniformity in the hardening operations manually. According to this invention, however, subjection of the several disks to the hardening steps is carried out in a purely mechanical manner on the felting drums 44 and by changing the sequence of the disks in the stack between each hardening step all of them are subjected to an absolutely uniform treatment. Thus, the present invention provides for uniformity and gives accurate dependable data, whereas if these steps were carried out manually any such degree of accuracy would be utterly impossible.

The mechanical hardening to which I have referred is made possible by using separator cloths between the several disks, so that they are precluded from felting to one another and these separator cloths are used for all four hardening steps of the first felting round. By thus separating the felts and changing their sequence in the stacking, the uniformity referred to is made possible with a stack of bats in contradistinction to individual manual manipulation.

The operations which have been described with reference to the first felting round are now repeated for the second, third, fourth, fifth, sixth and seventh rounds with a bottom cloth but no intermediate separator cloths are necessary. At the end of each round the diameters of the samples are each individually measured and noted, and let us assume that sample I measures 9.1" at the end of the second round, 8.0" at the end of the third, 7.3" at the end of the fourth, 7" at the end of the fifth and 6.8" at the end of the sixth and 6.7" at the end of the seventh round. In practice I mechanically felt on the drums 44 one-quarter minute for each of the first and second rounds, one-half minute for the third round, and one minute for each subsequent round. This completes the seven mechanical "felting" rounds of my method.

The samples are now individually subjected to manual "sizing" operations which are carried out as follows, e. g., with sample I. The sample is wet, rolled, wrapped in a cloth, laid upon the table 43 and rolled under the hands of the operator upon the surface of the table 43. Five strokes are imparted to the roll in this manner. It is then unrolled, turned at 90°, wet and stroked again by the hands of the operator, as before. This is repeated twice more, so that it is rolled four ways with five strokes each way, to collectively effect the first round of the sizing operation. It is then measured and we will say that it is found to have a diameter of 6.0". This completes the first round of the shrinking operations. Five such rounds are successively carried out on each sample and suppose, that sample I showed a diameter of 5.9" at the end of the second round, 5.6" at the end of the third round, 5.3" at the end of the fourth round and 5.2" at the end of the fifth round.

If it is desired, these shrinkage rounds may be continued to determine maximum shrinkage, although this is not necessary. However, by way of example, when the operations on sample I were continued, it was found that for two additional rounds the diameter was only decreased approximately .3" after which it stayed constant and showed no more shrinkage for succeeding rounds. Thus maximum shrinkage was determined, although, in practice, these latter rounds are not essential to obtain sufficient accuracy for production operations.

The sizing operations have been described as carried out manually although in practice I may accomplish them mechanically in either a "Taylor" or "Boesch" machine, both of which are well known to the art.

Figure 4:
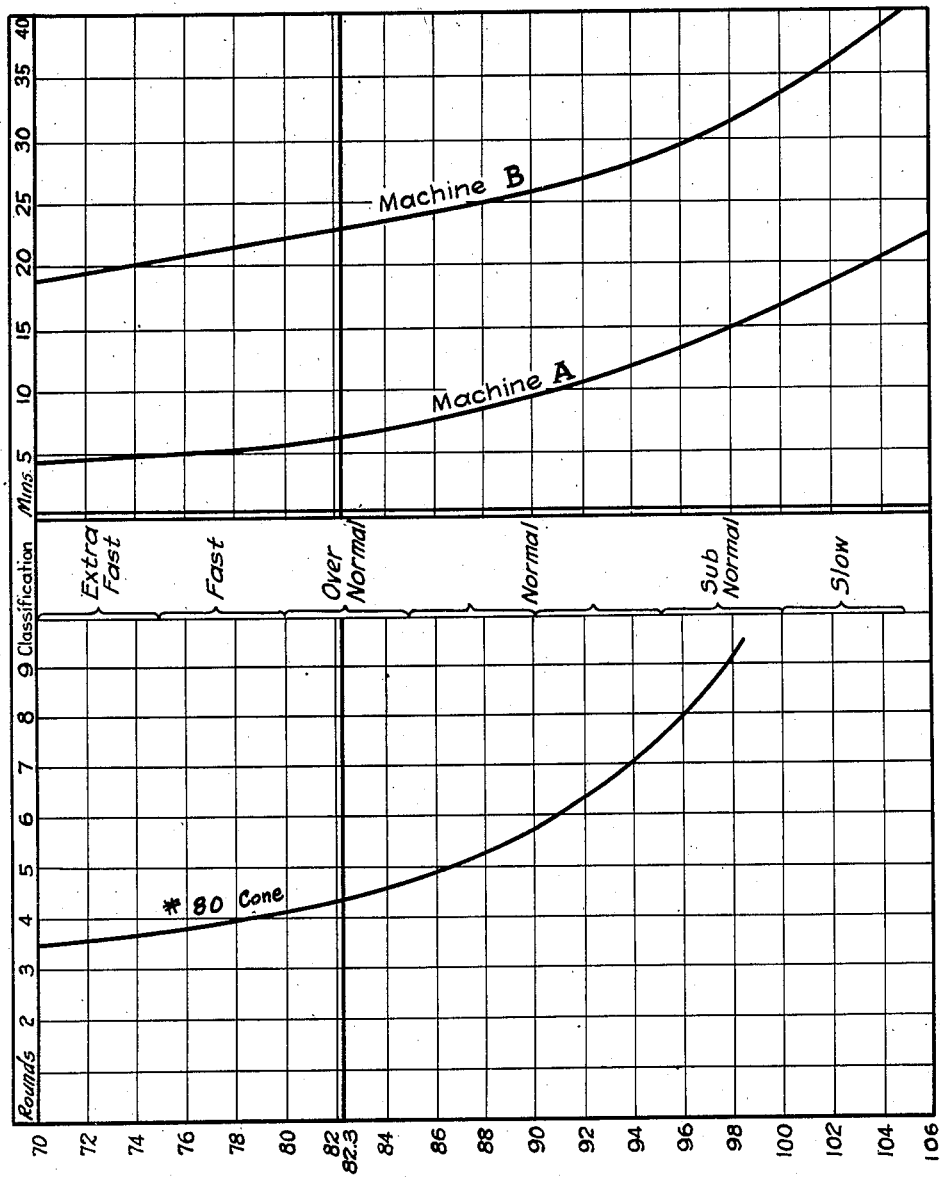
Figure 4 shows a chart used as hereinafter described.

Having obtained and noted the data referred to for each particular sample, it is possible to analyze the finished felts to determine their body, weight, texture, etc., and to decide therefrom which fur produced the desired felt. Having selected the fur to be produced, the data relative thereto is observed, and by virtue of the chart or graph shown in Figure 4, which I have developed through the testing of a great number of furs, one is able to readily determine the operations that should be carried out on commercial hat making machinery for the duplication of such felt. The manner of using the chart is as follows:

I add together the dimensions obtained during the bat forming step and the seven felting rounds. This, in the example given for sample I consists in the sum of 11.2, 10.4, 9.1, 8.0, 7.3, 7.0, 6.8, and 6.7 making a total of 53.3. I then add together the dimensions obtained in the five shrinkage rounds for sample I, namely, the sum of 6.0, 5.9, 5.6, 5.3, and 5.2, making a total of 27.0. Then I add together the two totals to make a grand total of 82.3 and by reference to the vertical column of numbers at the left hand side of the chart, I am able to pick out a transverse line which, where it intersects with the curve of the graph appropriate to the particular cone to be used in the commercial machine, will show the number of rounds to which the fur must be subjected in the forming machine, as well as the time required in the A and B machines of commercial manufacture, to duplicate the felt of sample I.

The particular example which we have been considering will require four rounds in the forming machine for a #80 cone, six minutes in the A machine, and 23 minutes in the B machine. Thus by giving the workmen these specifications, the fur of which sample I is typical, can be passed through commercial operations without further experimentation or danger of error or mistake, and a good product will be assured.

The particular information given with regard to cone and rounds has been prescribed with regard to the chart to which reference has been made and are offered by way of example to illustrate how the information and data gained from the tests in the method of and machine of this invention can be used and incorporated in the practical form. It will be understood, however, that the details of practical use of the present invention will, in a measure, depend upon the particular type of hat making machinery to be employed in commercial production and that the curves used will be appropriate to such conditions as will be present in commercial production. In other words, the chart to which reference has been made is not presumed to be an inflexible index for universal application but the principles therein exemplified may be readily adapted in each factory to the particular relations between testing and production departments.

By the method and apparatus which I have described, I am therefore able to classify fur in an accurate manner and this is something which has never been done before. From this classification, it is possible to properly indicate the treatment to which fur should be subjected to produce a predetermined product and this result is accomplished through a simple, inexpensive procedure, carried out in a small compact unit therein all operations can be immediately observed and their effects noted for guidance in commercial operations. This classification of characteristics of hatters' fur is something entirely new in this art. It fulfills a long felt want and eliminates time and waste of material incident to methods which have been practised for upwardly of a century in the hat making business.

An important feature of this invention resides in the formation of flat felts through the initial production of a flat bat and the subsequent felting and shrinkage of such a bat, with measurements periodically taken as the various steps progress, to determine the progressive behavior of the fur and to serve as a guide for commercial production. The behavior of such fur during felting may be observed with great accuracy when a flat form is employed and uniform felts produced in this way give the true characteristics of the fur and enable the operator to draw accurate conclusions on which quantity production may be safely and confidently based.

It will be apparent from the foregoing that when the method and apparatus of this invention is used one operator can test a great number of samples during a working day using a total amount of fur in these samples which is negligible, as compared to the relatively few samples which may be tested on production equipment using a total amount of fur greatly in excess of that employed according to this invention.

Testing and standardizing materials in technology, generally, means subjecting a prescribed quantity of material to a series of prescribed and controllable treatments in the course of which successive measurements are made. The records thereby obtained furnish the basis on which conclusions as to the quality and characteristics of the material can be arrived at. It is obviously impossible to comply with these requirements in the course of present day methods in a factory. Conical shape is not conducive to easily comparable measurements. Also the material is not distributed uniformly and the rate of distribution cannot be controlled. Furthermore there is no strict uniformity in handling. All the above requirements are, however, automatically attained according to the method and apparatus of this invention for with a flat disk there results uniformity of distribution, permits easy accurate measurements and the mechanically controlled treatment during felting achieves identity in the handling of the specimens. Thus, the behavior of different furs in the course of treatment, the total shrinkage achieved and the general appearance and feeling of the resulting felt samples give a true index of the furs to produce particular results which may be commercially desired. The successive dimensional changes of the felt during the successive testing steps form a basis for computing the shrinkage curve which supplies at a glance a picture of the behavior of the fur specimen in the process of gradual preparation and this is of greatest importance to technicians in this art for it shows at once the felting characteristic of the fur.

The foregoing detailed description sets forth the invention in illustrative practical forms, but the invention is to be understood as fully commensurate with the appended claim.

Having thus fully described the invention, what I claim as new and desire to secure by Letters Patent is:

In the art of testing the feltability of hatters' fur, the method which comprises forming from different samples of fur a succession of fluffy flat substantially circular fur bats of single thickness and of approximately the same weight and dimension and which dimension is a small fraction of the area of a hat cone, wetting said bats to form a like number of flat disks of single thickness, stacking said disks in superimposed relation, thereafter subjecting all of the disks, collectively, in stacked relation to a plurality of hardening rounds so that each of said disks receive substantially identical treatment, and thereafter subjecting the disks, individually, to a plurality of substantially identical sizing rounds, so that all of said disks receive substantially identical sizing treatment, to produce a plurality of flat felt samples peculiar to the particular samples of furs employed in the formation of the respective bats.

JACK D. SARTAKOFF.